(12) United States Patent
Kim (10) Patent No.: US 10,062,170 B2
(45) Date of Patent: Aug. 28, 2018

(54) APPARATUS AND METHOD FOR EXTRACTING OBJECT

(71) Applicant: ELECTRONICS AND TELECOMMUNICATIONS RESEARCH INSTITUTE, Daejeon (KR)

(72) Inventor: Jae-Hwan Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 40 days.

(21) Appl. No.: 15/230,297

(22) Filed: Aug. 5, 2016

(65) Prior Publication Data

US 2017/0278246 A1    Sep. 28, 2017

(30) Foreign Application Priority Data

Mar. 22, 2016  (KR) .................. 10-2016-0034078

(51) Int. Cl.
*G06K 9/00*   (2006.01)
*G06T 7/00*   (2017.01)
*G06K 9/46*   (2006.01)

(52) U.S. Cl.
CPC ............. *G06T 7/0042* (2013.01); *G06K 9/00* (2013.01); *G06K 9/4652* (2013.01); *G06T 2207/10024* (2013.01)

(58) Field of Classification Search
CPC .. G06K 9/4647; G06K 9/4604; G06K 9/4652; G06K 9/4623; G06K 9/4671;
(Continued)

(56) References Cited

U.S. PATENT DOCUMENTS 7,692,664 B2   4/2010  Weiss et al.
8,811,750 B2   8/2014  Chang et al.
(Continued)

FOREIGN PATENT DOCUMENTS

KR   10-2006-0007901 A   1/2006
KR   10-2013-0072073 A   7/2013
KR      10-1565829 B1   11/2015

OTHER PUBLICATIONS

Jaehwan Kim et al., "UnAMT: Unsupervised Adaptive Matting Tool for Large-Scale Object Collections", SIGGRAPH 2015 Posters, Aug. 9-13, 2015, Los Angeles, CA.
(Continued)

*Primary Examiner* — Aklilu Woldemariam (57) ABSTRACT

According to one general aspect, an apparatus for extracting an object includes an image receiver configured to receive an image; a coupled saliency-map generator configured to generate a coupled saliency-map which is the sum of the product of a global saliency-map of the image and a predetermined weight value and a local saliency-map; an adaptive tri-map generator configured to generate an adaptive tri-map corresponding to the coupled saliency-map; an alpha matte generator configured to generate an alpha matte based on the adaptive tri-map; and an object detector configured to extract an object according to transparency of the alpha matte to generate an object image.

6 Claims, 8 Drawing Sheets

(58) Field of Classification Search
CPC ........... G06K 9/629; G06K 9/00718; G06K 9/00751; G06K 9/4676; G06K 2209/01; G06K 9/00416; G06K 9/00429; G06K 9/00852; G06K 9/00859; G06K 9/00872; G06K 9/00926; G06K 9/34; G06K 9/6255; G06K 9/723; G06K 9/4638; G06T 2207/10016; G06T 2207/10024; G06T 7/2033; G06T 7/2093; G06T 7/246; G06T 7/11; G06T 7/194; G06T 2207/20004; G06T 2207/20016; G06T 2207/20076; G06T 2207/20081; G06T 7/136; G06T 7/162; G06T 7/0042; G06T 11/60; G06T 2207/20132; G06T 3/0012; G06T 7/262; G06T 13/80; G06T 2207/20036; G06T 3/0006; G06T 3/0056; G06T 7/0038; G06T 7/38; H04N 5/272; H04N 5/275
USPC ....... 382/103, 132, 176, 167, 180, 173, 107, 382/199; 345/592, 589, 629; 348/109, 348/441
See application file for complete search history.

(56) References Cited

U.S. PATENT DOCUMENTS

| | | | | |
|---|---|---|---|---|
| 8,811,771 | B2* | 8/2014 | Shechtman | G06T 13/80 382/118 |
| 9,042,648 | B2* | 5/2015 | Wang | G06T 7/143 382/118 |
| 9,092,876 | B2 | 7/2015 | Han | |
| 2003/0081836 | A1* | 5/2003 | Averbuch | G06K 9/38 382/199 |
| 2007/0185946 | A1* | 8/2007 | Basri | G06K 9/34 708/200 |
| 2008/0304708 | A1* | 12/2008 | Le Meur | G06K 9/4623 382/107 |
| 2010/0322521 | A1* | 12/2010 | Tal | G06T 11/60 382/199 |
| 2013/0050574 | A1* | 2/2013 | Lu | G06K 9/00751 348/441 |
| 2013/0124951 | A1* | 5/2013 | Shechtman | G06T 13/80 715/201 |
| 2015/0071532 | A1* | 3/2015 | Ruan | G06K 9/4604 382/165 |
| 2015/0116350 | A1* | 4/2015 | Lin | G06T 3/0012 345/620 |
| 2015/0117784 | A1* | 4/2015 | Lin | G06K 9/4671 382/195 |
| 2016/0364877 | A1* | 12/2016 | Kim | G06T 7/194 |

OTHER PUBLICATIONS

Jaehwan Kim et al., "Unsupervised Salient Object Matting", ACIVS 2016, LNCS 9386, Oct. 26-29, 2015, pp. 1-12, Springer International Publishing. Switzerland.

* cited by examiner

Algorithm 2 Preconditioned Conjugate Gradient method

1: procedure PCGSOLVER($L, W_v, \hat{\alpha}_v, \lambda, i_{max}, \epsilon$)
2:     $P \leftarrow L + \lambda W_v, M \leftarrow diag(P), b \leftarrow \lambda\hat{\alpha}_v$
3:     $i \leftarrow 0$
4:     $r_0 \leftarrow b - P\alpha_0$
5:     $d_0 \leftarrow M^{-1}r_0$
6:     $\delta_{new} \leftarrow r_0^T d_0$
7:     $\delta_0 \leftarrow \delta_{new}$
8:     while $i < i_{max}$ and $\delta_{new} > \epsilon^2 \delta_0$ do
9:         $q_i \leftarrow Pd_i$
10:        $\gamma_i \leftarrow \delta_{new}/d_i^T q_i$
11:        $\alpha_{i+1} \leftarrow \alpha_i + \gamma_i d_i$
12:        $r_{i+1} \leftarrow r_i - \gamma_i q_i$
13:        $s_{i+1} \leftarrow M^{-1}r_{i+1}$
14:        $\delta_{old} \leftarrow \delta_{new}$
15:        $\delta_{new} \leftarrow r_{i+1}^T s_{i+1}$
16:        $\beta_{i+1} \leftarrow \delta_{new}/\delta_{old}$
17:        $d_{i+1} \leftarrow s_{i+1} + \beta_{i+1}d_i$
18:        $i \leftarrow i + 1$
19:     end while
20:     return $\alpha^*$
21: end procedure

APPARATUS AND METHOD FOR EXTRACTING OBJECT

CROSS REFERENCE TO RELATED APPLICATION

This application claims the benefit under 35 U.S.C. § 119(a) of Korean Patent Application No. 10-2016-0034078 filed on Mar. 22, 2016 in the Korean Intellectual Property Office, the entire disclosure of which is incorporated herein by reference for all purposes.

BACKGROUND

1. Technical Field

The following description relates to a technique for extracting objects in an image and more particularly, to a technique for extracting objects in an image using a coupled saliency-map, an adaptive tri-map and an alpha matte.

2. Description of Related Art

A precise automated extraction technique of salient objects plays an important role in a variety of areas of for example large-scale annotated training sets with more precision, and improving the performance of object recognition or content-based image retrieval, etc. Framework such as object-centric spatial pooling and co-segmentation sets an object region as an object-of-interest instead of general bounding box representation. When object-of-interest sets are used in a system, precision of the set object region has a big impact on the system performance.

A method for extracting salient objects may be divided into a user-guided matting method and a fully automated object extraction method. The user-guided matting method requires a lot of manpower to extract salient objects form a large-scale image.

The fully automated object extraction method may not provide accurate extraction of objects without user intervention and advance information. Thus, the fully automated object extraction method extracts objects from an image by being provided with a tri-map composed of foreground, background and unknown regions. However, it requires high costs for labors and times to generate a tri-map for each image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of this disclosure is to provide an apparatus and a method for automatically extracting objects from an image using a coupled saliency-map, an adaptive tri-map and an alpha matte.

According to one general aspect, an apparatus for extracting an object includes an image receiver configured to receive an image; a coupled saliency-map generator configured to generate a coupled saliency-map which is the sum of the product of a global saliency-map of the image and a predetermined weight value, and a local saliency-map; an adaptive tri-map generator configured to generate an adaptive tri-map corresponding to the coupled saliency-map; an alpha matte generator configured to generate an alpha matte based on the adaptive tri-map; and an object detector configured to extract an object according to transparency of the alpha matte to generate an object image.

The local saliency-map may be a saliency-map including pixels representing Euclidean distance between a mean color vector of each pixel of the image and a vector generated through Gaussian blur treatment for the image. The global saliency-map may be a saliency-map defined based on space and color of regions which are segmented to each component after representing the image in a Gaussian mixture model composed of a plurality of components.

The adaptive tri-map generator may generate a tri-map from the coupled saliency-map through Gaussian blur and image clustering, select a pixel, of which distance is the least to any one of mean color values of foreground region, background region and unknown region of the tri-map among pixels of the coupled saliency-map, as the shortest distance pixel, and generate the adaptive tri-map by replacing a pixel value of the tri-map, corresponding to the shortest distance pixel and a pixel adjacent to the shortest distance pixel, as a mean color value of the foreground region when the shortest distance pixel is identical to the mean color value of the foreground region and is located within the unknown region of the tri-map.

The alpha matte generator may generate the alpha matte through a parallel processing using GPGPU by a preconditioned conjugate gradient method.

The apparatus for extracting an object may further include an output interface configured to show extraction result of the object; and an input interface configured to receive a tri-map correction input which requests for correcting the adaptive tri-map from a user, wherein the adaptive tri-map generator may correct the adaptive tri-map based on the tri-map correction input.

According to another general aspect, a method for extracting an object using an apparatus for extracting an object from an image includes receiving the image; generating a coupled saliency-map which is the sum of the product of a global saliency-map of the image and a predetermined weight value and a local saliency-map; generating an adaptive tri-map corresponding to the coupled saliency-map; generating an alpha matte based on the adaptive tri-map; and extracting an object according to transparency of the alpha matte to generate an object image.

The local saliency-map may be a saliency-map including pixels representing Euclidean distance between a mean color vector of each pixel of the image and a vector generated through Gaussian blur treatment for the image, and the global saliency-map may be a saliency-map defined based on space and color of regions which are segmented to each component after representing the image in a Gaussian mixture model composed of a plurality of components.

The generating an adaptive tri-map corresponding to the coupled saliency-map may include: generating a tri-map from the coupled saliency-map through Gaussian blur and image clustering; selecting a pixel, of which distance is the least to any one of mean color values of foreground region, background region and unknown region of the tri-map among pixels of the coupled saliency-map, as the shortest distance pixel; and generating the adaptive tri-map by replacing a pixel value of the tri-map, corresponding to the shortest distance pixel and a pixel adjacent to the shortest distance pixel, as a mean color value of the foreground region when the shortest distance pixel is identical to the mean color value of the foreground region and is located within the unknown region of the tri-map.

The generating an alpha matte based on the adaptive tri-map may include generating the alpha matte through a parallel processing using GPGPU by a preconditioned conjugate gradient method.

The method for extracting an object may further include showing extraction result of the object; receiving a tri-map correction input which requests for correcting the adaptive tri-map from a user; correcting the adaptive tri-map according to the tri-map correction input; and generating an object image according to the corrected adaptive tri-map.

The apparatus and the method for extracting an object according to examples allows automatically generating a tri-map corresponding to an image and automatically extracting a salient object from the image through the tri-map.

BRIEF DESCRIPTION OF DRAWINGS

Hereinafter, the following description will be described with reference to embodiments illustrated in the accompanying drawings. To help understanding of the following description, throughout the accompanying drawings, identical reference numerals are assigned to identical elements. The elements illustrated throughout the accompanying drawings are mere examples of embodiments illustrated for the purpose of describing the following description and are not to be used to restrict the scope of the following description.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Since there can be a variety of permutations and embodiments of the following description, certain embodiments will be illustrated and described with reference to the accompanying drawings. This, however, is by no means to restrict the following description to certain embodiments, and shall be construed as including all permutations, equivalents and substitutes covered by the ideas and scope of the following description.

When one element is described as "transfer a signal" or "transmit a signal" to another element, it shall be construed as transfer or transmit a signal to the other element directly but also as possibly having another element in between.

Figure 1:
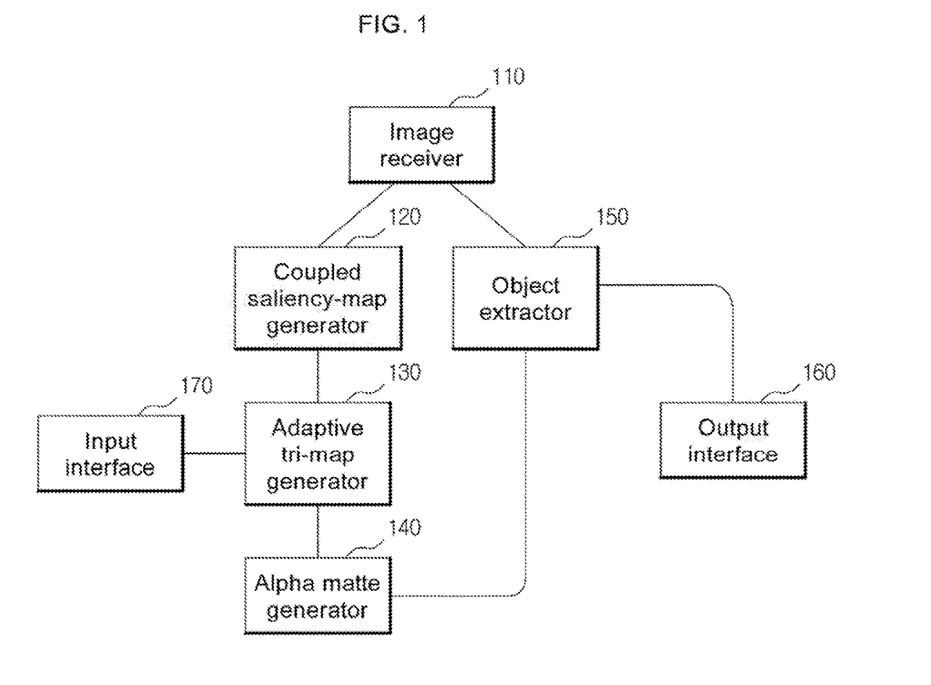
FIG. 1 is a block diagram illustrating an example of an apparatus for extracting an object.
Figure 2:
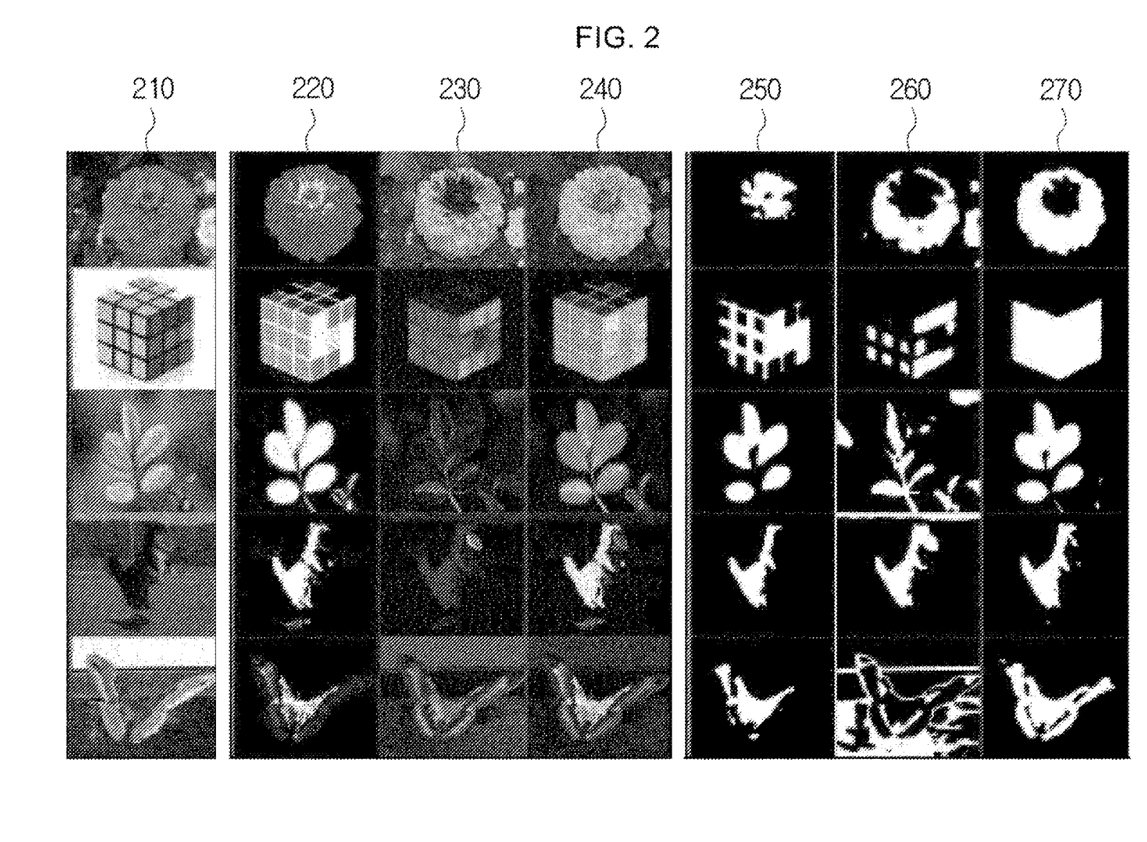
FIG. 2 is a diagram illustrating examples of images inputted to an apparatus for extracting an object according to an example of the present invention, saliency-maps and filtered saliency-maps.
Figure 3:
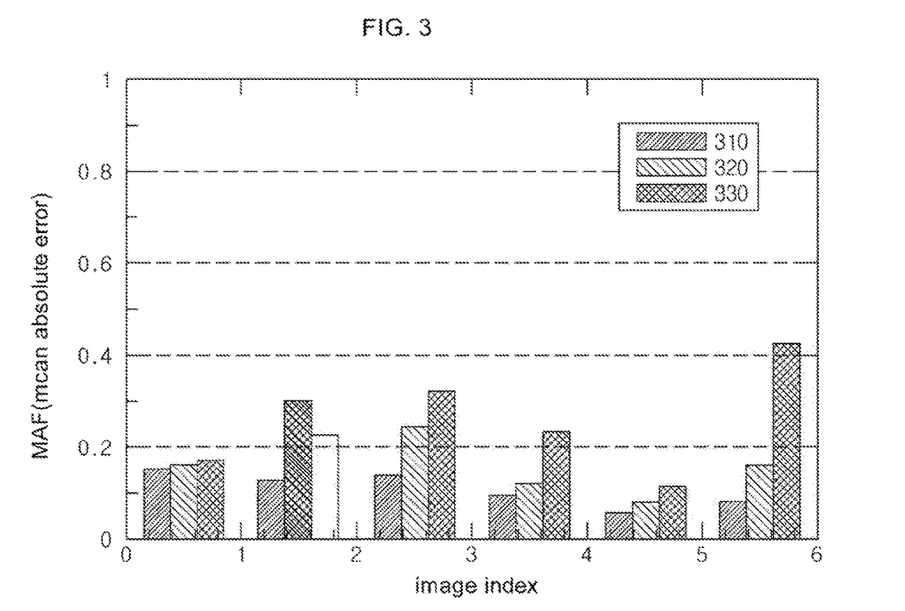
FIG. 3 is a graph illustrating mean absolute error (MAE) of a coupled saliency-map, a local saliency-map and a global saliency-map generated by an apparatus for extracting an object according to an example of the present invention.
Figure 4:
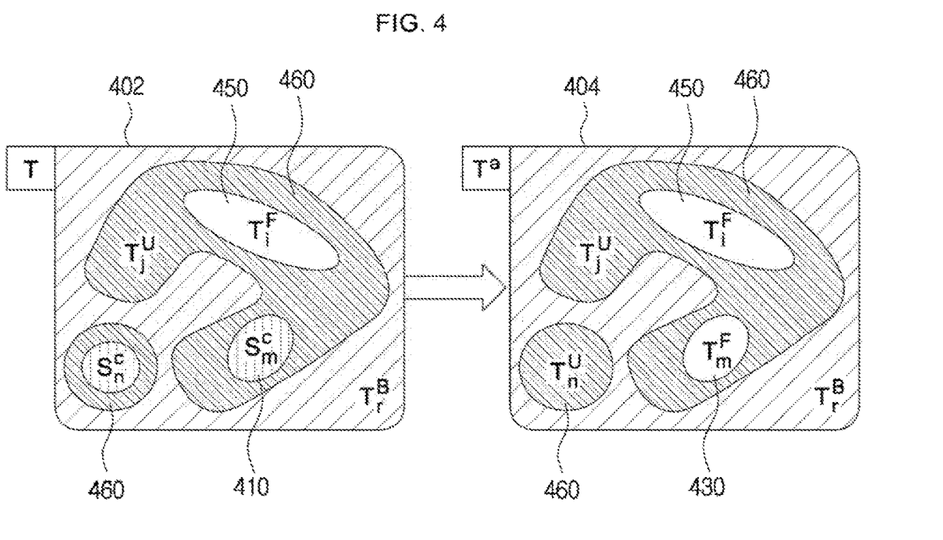
FIG. 4 is a diagram illustrating a process for generating an adaptive tri-map by an apparatus for extracting an object according to an example of the present invention.
Figure 5:
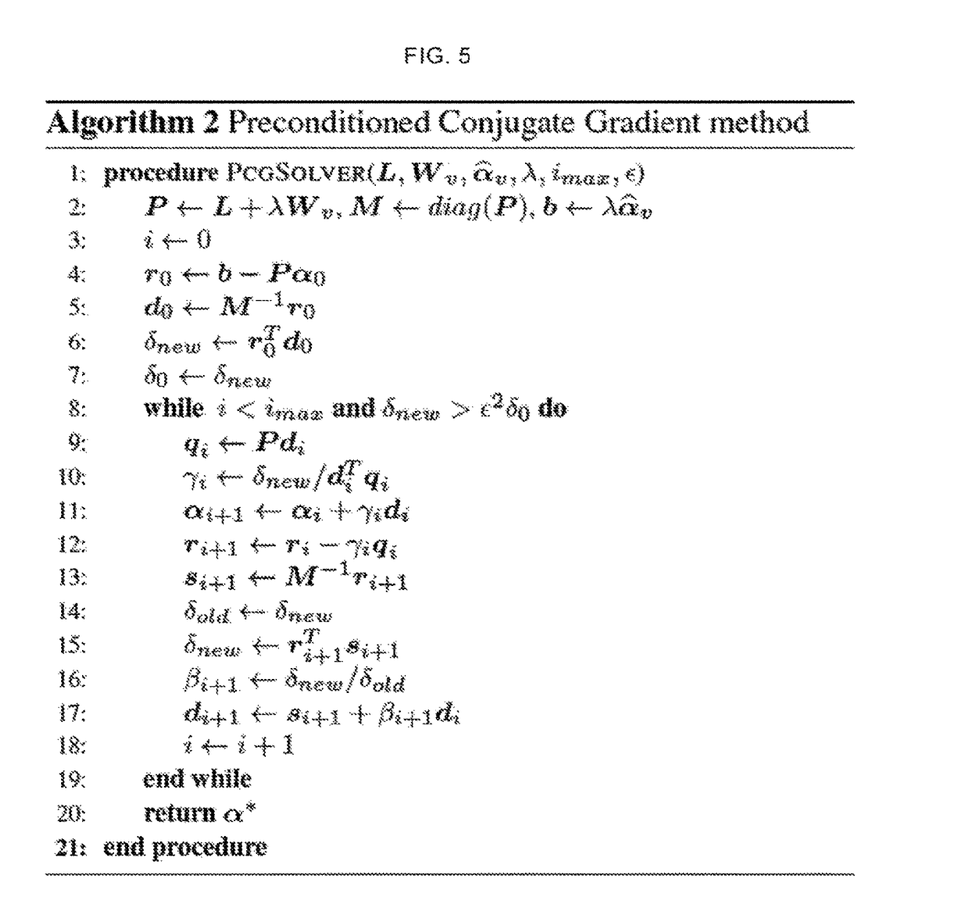
FIG. 5 illustrates a preconditioned conjugate gradient (PCG) algorithm to generate an alpha matte by an apparatus for extracting an object according to an example of the present invention.

FIG. 1 is a block diagram illustrating an example of an apparatus for extracting an object, FIG. 2 is a diagram illustrating examples of images inputted to an apparatus for extracting an object according to an example of the present invention, saliency-maps and filtered saliency-maps, FIG. 3 is a graph illustrating mean absolute error (MAE) of a coupled saliency-map, a local saliency-map and a global saliency-map generated by an apparatus for extracting an object according to an example of the present invention, FIG. 4 is a diagram illustrating a process for generating an adaptive tri-map by an apparatus for extracting an object according to an example of the present invention, and FIG. 5 illustrates a preconditioned conjugate gradient (PCG) algorithm to generate an alpha matte by an apparatus for extracting an object according to an example of the present invention.

Referring to FIG. 1, an apparatus for extracting an object according to an example includes an image receiver 110, a coupled saliency-map generator 120, an adaptive tri-map generator 130, an alpha matte generator 140, an object extractor 150, an output interface 160, and an input interface 170.

The image receiver 110 may receive an image from an external device such as a terminal, a storing medium and the like through network or a predetermined input terminal. The image receiver 110 may transfer the received image to the coupled saliency-map generator 120 and the object extractor 150.

The coupled saliency-map generator 120 may generate a coupled saliency-map corresponding to the received image. The coupled saliency-map generator 120 may generate a balanced coupled saliency-map between a local feature (e.g., edges, luminance color)-based saliency-map (spatial frequency & luminance based saliency-map, hereinafter, referred to as a local saliency-map) and a global feature (e.g., region-level duster and contrast)-based saliency-map (spatial region & color contrast based saliency-map, hereinafter, referred to as a global saliency-map). The coupled saliency-map generator 120 may generate a coupled saliency-map according to the following Equation 1:

$$S^c = S^f + \omega S^g \quad \text{[Equation 1]}$$

$$= \sum_{j=1}^{N} S_j^f + \omega \sum_{p=1}^{K} S_{C_p}^g$$

$$= \sum_{j=1}^{N} \|\mathcal{I}_\mu - (G_\sigma * \mathcal{I}_j)\| +$$

$$\omega \sum_{p=1}^{K} \sum_{c_q \neq c_p} \exp\left(\frac{D_s(c_q, c_p)}{-\sigma_s^2}\right) \cdot \omega_{C_q} \cdot D_r(c_q, c_p),$$

$$N = \sum_{p=1}^{K} |c_p|$$

wherein, $I_i$ may be a vector of the i, pixel of the image, $S^f$ may be a local saliency-map including pixels representing Euclidean distance between the mean color vector $I_\mu$ and the Gaussian blurred vector of N pixels of the image, $(G_o*I_j)$. $S^{g'}$ may be a global saliency-map defined as an integration of region-based spatial and color contrast relationships after a Gaussian mixture model based representation having K components $\{c_p\}_{p=1}^{K}$. $|c_p|$ may be the number of pixels of a component region $c_p$. $D_s(c_q, c_p)$ may be a spatial distance between component regions $c_p$ and $c_q$. $D_r(c_q, c_p)$ may be a color distance between component regions $c_p$ and $c_q$. $\sigma_s$ may be a stiffness parameter representing the strength of color contrast weighting. $\omega_{c_q}$ may be a weight value representing the number of pixels in the component $c_q$. $\omega \in [0.5, 1.5]$ may be a weight value stiffness parameter which balances between $S^f$ and $S^{g'}$, preferable may be set to 1.

Here, the local saliency-map represents uniformly highlighted salient regions with well-defined boundaries of high frequencies in the CIELab color apace, while the global saliency-map represents spatial distance and color distance through image segmentation in the RGB color space.

Referring to FIG. 2, it is noted that a local salency-map 220 among the local saliency-map 220, a global saliency-map 230 and a coupled saliency-map 240 for an image 210 is the most similar form to the image. Here, when it is represented by black and white images as filtered maps 250, 260, 270 generated through clustering each pixel of the local saliency-map 220, the global saliency-map 230 and the coupled saliency-map 240 with two groups, MAE (mean absolute error) of the filtered map 270 for the coupled saliency-map is lower than those of the others. For example, referring to FIG. 3, MAE of the filtered map 250 for the local saliency-map is 310, MAE of the filtered map 260 for the global saliency-map is 320, and MAE of the filtered map 240 for the coupled saliency-map 240 is 330. Since precision of black and white images of the coupled saliency-map is obtained by compensating the local saliency-map and the global saliency-map with each other, that is higher than the precision of black and white images of the local saliency-map and the global saliency-map.

Furthermore, MAE and F-measure of the local saliency-map, the global saliency-map, the coupled saliency-map for two images, and MAE and F-measure for filtered maps of the local saliency-map, the global saliency-map, the coupled saliency-map are shown in the following Table 1.

TABLE 1

| Image | Map | Before filtering | | After filtering | |
|---|---|---|---|---|---|
| | | MAE | F-measure | MAE | F-measure |
| Image 1 | Coupled saliency-map | 0.1876 | 0.9434 | 0.1447 | 0.9375 |
| | Global saliency-map | 0.1232 | 0.9502 | 0.1449 | 0.9368 |
| | Local saliency-map | 0.2676 | 0.9042 | 0.2062 | 0.8929 |
| image 2 | Coupled saliency-map | 0.1557 | 0.9588 | 0.1036 | 0.9596 |
| | Global saliency-map | 0.1011 | 0.9628 | 0.1209 | 0.9533 |
| | Local saliency-map | 0.2279 | 0.9178 | 0.1629 | 0.9216 |

Here, MAE and F-measure are values representing similarity of images which can be obtained by the following Equation 2:

$$MAE = \frac{1}{|\mathcal{I}|} \sum_i |A_i^* - \mathcal{G}_i| \in [0, 1], \quad \text{[Equation 2]}$$

$$F_\beta = (1 + \beta^2) \cdot \frac{\text{Precision} \cdot \text{Recall}}{\beta^2 \cdot \text{Precision} + \text{Recall}} \in [0, 1],$$

wherein, $G_i$ may be the ith pixel of a ground-truth image, and $A_i^*$ may be the ith pixel of each saliency-map. $F_\beta$ may be F-measure $\beta^2=1$, representing harmonic mean of precision and recall.

The coupled saliency-map generator 120 may transfer the coupled saliency-map to the adaptive tri-map generator 130.

The adaptive tri-map generator 130 may generate an adaptive tri-map by referring to the coupled saliency-map. For example, the adaptive tri-map generator 130 may generate a tri-map by applying Gaussian blur and image clustering to the coupled saliency-map.

Then, the adaptive tri-map generator 130 may select a pixel, of which distance is the least to any one of mean color values of tri-map's foreground region, background region and unknown region (hereinafter, referred to as 'the shortest distance pixel'), among pixels in the coupled saliency-map. When the shortest distance pixel is a pixel identical to the foreground mean color value and located in the unknown region, the adaptive tri-map generator 130 may generate an adaptive tri-map by replacing the shortest distance pixel and the pixel which is adjacent to the shortest distance pixel (e.g., 410 in FIG. 4) with a tri-map's foreground mean color value as 430 in FIG. 4. Here, 402 in FIG. 4 is a tri-map, 404 is an adaptive tri-map, 450 is a foreground region, 460 is an unknown region, and the rest region is a background region.

The adaptive tri-map generator 130 may transfer the adaptive tri-map to the alpha matte generator 140.

The alpha matte generator 140 may generate an alpha matte by referring to the adaptive tri-map. The alpha matte generator 140 may determine an alpha value $\hat{\alpha}_v$ pre-defined by setting transparency as 1 at the position of a pixel located in the foreground region of the adaptive tri-map among pixels of the image, and transparency as 0 at the position of a pixel located in the background region. The alpha matte generator 140 may generate a pre-defined alpha value of each pixel of the image according to the following Equation 3:

$$\hat{\alpha}_v = \begin{cases} 1, & \text{if } v \in \mathcal{T}^\mathcal{F} \\ 0, & \text{if } v \in \mathcal{T}^\mathcal{B} \end{cases}, \quad \text{[Equation 3]}$$

$$\forall v \in \mathcal{V}, \text{ and } \mathcal{T} = \{\mathcal{T}^\mathcal{F}, \mathcal{T}^\mathcal{B}, \mathcal{T}^\mathcal{U}\},$$

wherein, v is a pixel of an image, V is an image, $T^F$ is a foreground region, $T^B$ is a background region, $T^u$ is a unknown region, T is a tri-map.

The alpha matte generator 140 may generate an alpha matte by employing the pre-defined alpha value. For example, the alpha matte generator 140 may generate transparency corresponding to each pixel of the alpha matte by employing a sparse linear system represented by the following Equation 4:

$$(L+\lambda W_v)\alpha = \lambda \hat{\alpha}_v \quad \text{[Equation 4]}$$

wherein, L is a matting Laplacian matrix, $W_v$ is a diagonal matrix which consists of elements having pre-defined alpha values. Here, the matting Laplacian matrix may be represented by $L=D-A$, in which A is a matting affinity matrix, which is a matrix having each element value according to the following Equation 5. α is transparency of the alpha matte.

$$\sum_{k|(i,j)\in w_k} \frac{1}{|w_k|}\left\{1+(\mathcal{I}_i-\mu_k)\left(\sum_k+\frac{\epsilon}{|w_k|}I_c\right)^{-1}(\mathcal{I}_j-\mu_k)\right\} \quad \text{[Equation 5]}$$

Here, $\mu_k$ is mean in the kth local window, $\Sigma_k$ s a covariance matrix in the kth local window, $I_c$ is a c×c identity matrix.

D may be a diagonal matrix, which consists of elements such as $D_{ii}=\Sigma_j A_{ij}$.

The Equation 4 is an equation obtained by inducing the matting equation of Eq. 6 as Lagranglan equation according to Equation 7 and then differentiating the Lagranglan equation.

$$\operatorname{argmin}_\alpha \alpha^T L\alpha, \quad \text{[Equation 6]}$$
$$\text{s.t. } W_v\alpha = \hat{\alpha}_v,$$
$$0 \leq \alpha \leq 1, \forall v \in \mathcal{V},$$

$$\alpha^* = \operatorname*{argmin}_\alpha \alpha^T L\alpha + \lambda(\alpha^T - \hat{\alpha}_v^T)W_v(\alpha - \hat{\alpha}_v), \quad \text{[Equation 7]}$$

The alpha matte generator 140 may transfer the alpha matte to the object extractor 150.

The object extractor 150 may determine the region of the pixel with the transparency of the alpha matte of 1 as an object region and then generate and output the object image including the pixel value of the object region.

The output interface 160 may display object extraction result by being connected with an output device such as a monitor. Accordingly, a user may see the object extraction result through the output device.

The input interface 170 may receive a tri-map correction input by a user to correct the adaptive tri-map generated by the adaptive tri-map generator 130. The input interface 170 may transfer the tri-map correction input to the adaptive tri-map generator 130. The adaptive tri-map generator 130 may correct the adaptive tri-map based on the tri-map correction input and transfer the corrected adaptive tri-map to the alpha matte generator 140. The alpha matte generator 140 may generate an alpha matte based on the corrected adaptive tri-map and the object extractor 150 may extract an object based on the re-generated alpha matte.

Here, the alpha matte generator 140 may generate alpha matte with parallel processing by using General-Purpose computing on Graphics Processing Units (GPGPU) through a direct method of CF (cholesky Factorization), a iterative method of CG (Conjugate Gradient) or PCG (preconditioned conjugate gradient). An alpha matte generation algorithm through PCG may be represented as shown in FIG. 5, in which $i_{max}$ is a maximum performance repetition rate during performing the PCG algorithm and ε is a thresholding of a predetermined performance result error.

The apparatus for extracting an object according to an example is able to generate each alpha matte fast for a large-scale image by reducing computing time to generate alpha matte.

Figure 6:
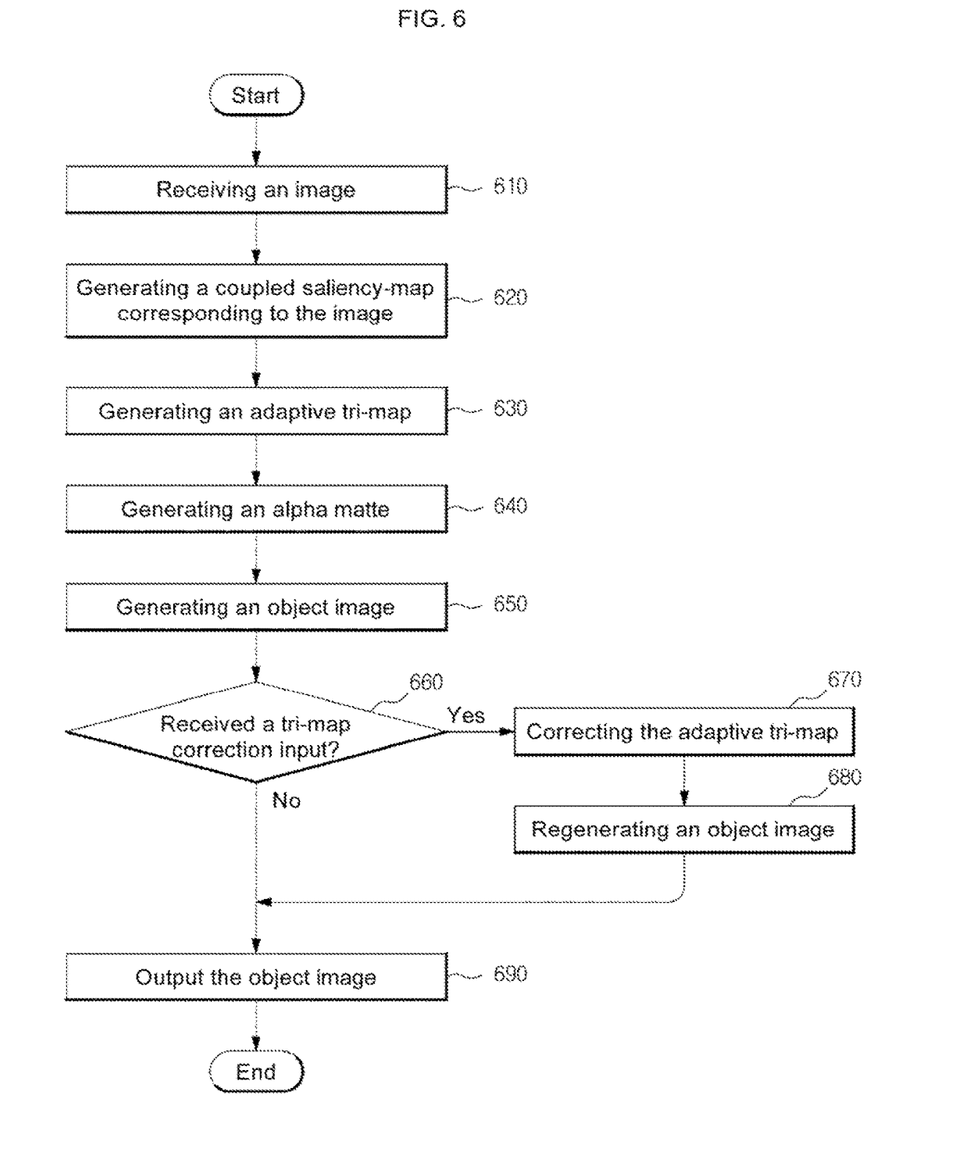
FIG. 6 is a flowchart illustrating an example of a method for extracting an object by an apparatus for extracting an object according to an example of the present invention.

FIG. 6 is a flowchart illustrating an example of a method for extracting an object by an apparatus for extracting an object according to an example of the present invention.

Referring to FIG. 6, in step 610, an apparatus for extracting an object according to an example receives an image from an external device.

In step 620, the apparatus for extracting an object generates a coupled saliency-map by referring to the image.

In step 630, the apparatus for extracting an object generates an adaptive tri-map using the coupled saliency-map. A process for generating an adaptive tri-map using the coupled saliency-map will be explained in more detail with reference to FIG. 7 below.

In step 640, the apparatus for extracting an object generates an alpha matte corresponding to the adaptive tri-map.

In step 650, the apparatus for extracting an object extracts an object through the alpha matte and generates an object image including the object.

In step 660, the apparatus for extracting an object determines whether a tri-map correction input is received from a user or not.

When it is determined as that the tri-map correction input is received from a user, the apparatus for extracting an object corrects the adaptive tri-map according to the tri-map correction input in step 670.

In step 680, the apparatus for extracting an object regenerates an object image by extracting an object according to the corrected adaptive tri-map.

In step 690, the apparatus for extracting an object outputs the extracted object image.

Figure 7:
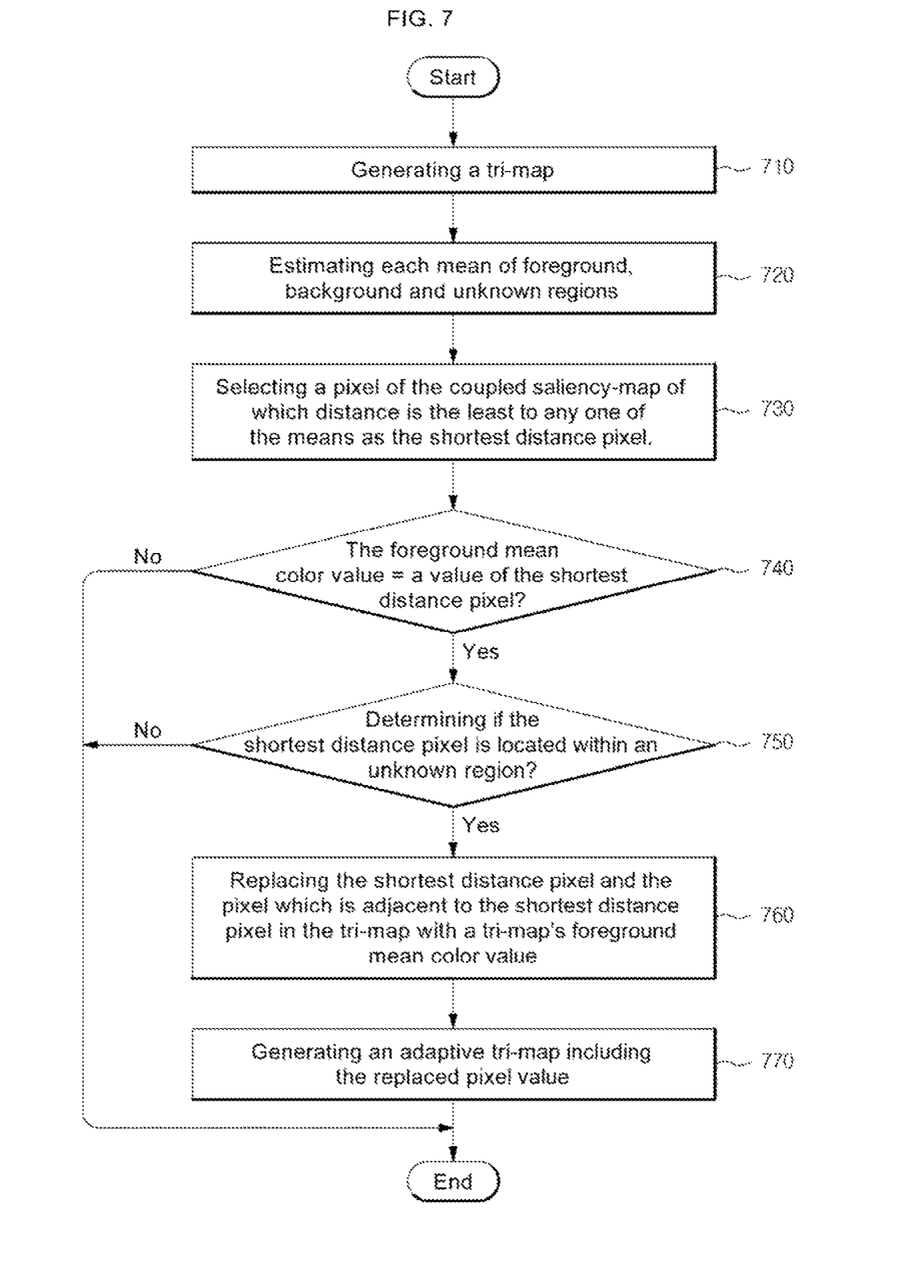
FIG. 7 is a flowchart illustrating an example of a method for extracting an object from an image by an apparatus for extracting an object according to an example of the present invention.

FIG. 7 is a flowchart illustrating an example of a method for extracting an object from an image by an apparatus for extracting an object according to an example of the present invention. Here, FIG. 7 corresponds to the step 620 in FIG. 6. Each process is a process to be performed repeatedly or in parallel for each pixel of the coupled saliency-map.

Referring to FIG. 7, in step 710, the apparatus for extracting an object generates a tri-map according to the coupled saliency-map. For example, the apparatus for extracting an object may generate a tri-map by applying Gaussian blur and image clustering to the coupled saliency-map.

In step 720, the apparatus for extracting an object estimates each mean of foreground, background and unknown regions of the tri-map.

In step 730, the apparatus for extracting an object selects a pixel of the coupled saliency-map of which distance is the least to any one of the means as the shortest distance pixel.

In step 740, the apparatus for extracting an object determines whether the foreground mean color value is identical to a value of the shortest distance pixel.

In step 740, when the foreground mean color value is not identical to a value of the shortest distance pixel, the apparatus for extracting an object ends the process for generating an adaptive tri-map for the shortest distance pixel.

On the other hand, when the foreground mean color value is identical to a value of the shortest distance pixel, the apparatus for extracting an object determines if the shortest distance pixel is located within an unknown region in step 750.

When it is determined as that the shortest distance pixel is not located within an unknown region, the apparatus for extracting an object ends a process for generating an adaptive tri-map for the shortest distance pixel.

On the other hand, when it is determined as that the shortest distance pixel is located within an unknown region, the apparatus for extracting an object replaces the shortest distance pixel and the pixel which is adjacent to the shortest distance pixel in the tri-map with a tri-map's foreground mean color value in step 760.

In step 770, the apparatus for extracting an object generates an adaptive tri-map including the replaced pixel value.

Figure 8:
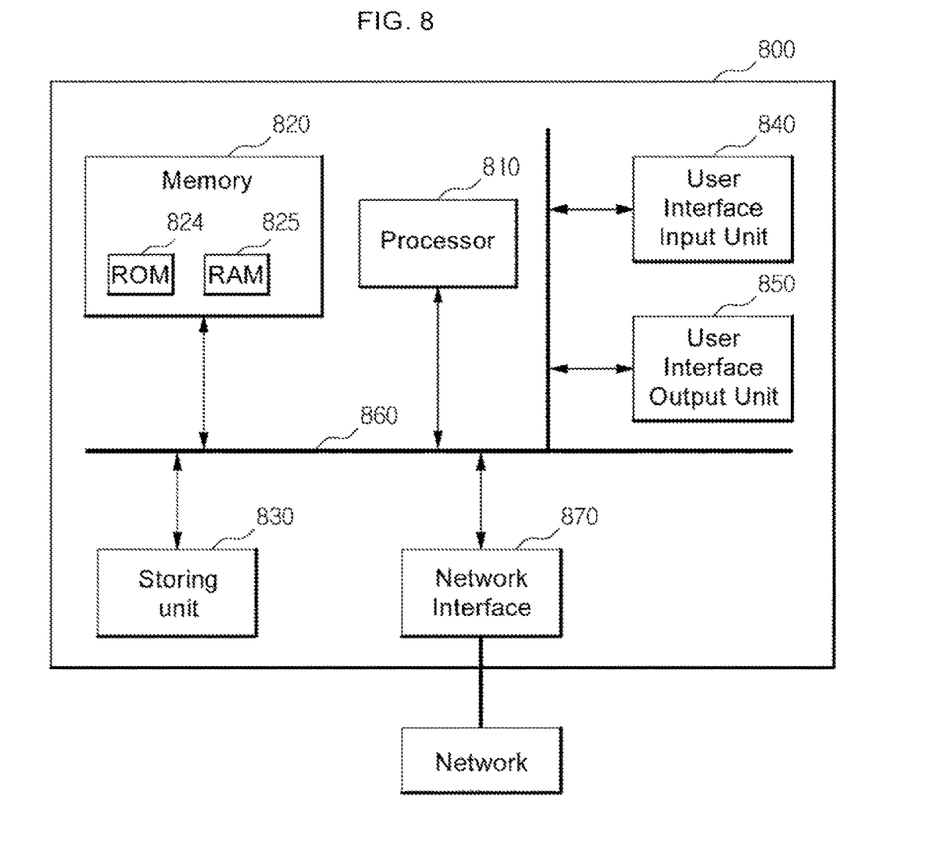
FIG. 8 is a diagram illustrating a computer system in which an apparatus for extracting an object according to an example of the present invention is implemented.

Exemplary embodiments of the present disclosure may be implemented in a computer system. FIG. 8 is a diagram illustrating a computer system in which an apparatus for extracting an object according to an example of the present invention is implemented.

Exemplary embodiments of the present disclosure may be implemented in a computer system, for example, a computer readable recording medium. As shown in FIG. 8, a computer system 800 may include at least one of at least one processor 810, a memory 820, a storing unit 830, a user interface input unit 840 and a user interface output unit 850 in which they may be communicate with each other through a bus 860. The computer system 800 may further include a network interface 870 to connect to a network. The processor 810 may be a CPU or semiconductor device which executes processing commands stored in the memory 820 and/or the storing unit 830. The memory 820 and the storing unit 830 may include various types of volatile/non-volatile storage media. For example, the memory may include ROM 824 and RAM 825.

Accordingly, the exemplary embodiment of the present disclosure can be implemented by the method which the computer is implemented or in non-volatile computer recording media stored in computer executable instructions. The instructions can perform the method according to at least one embodiment of the present disclosure when they are executed by a processor.

What is claimed is:

1. An apparatus for extracting an object comprising:
an image receiver configured to receive an image;
a coupled saliency-map generator configured to generate a coupled saliency-map which is the sum of the product of a global saliency-map of the image and a predetermined weight value and a local saliency-map, wherein the local saliency-map is a saliency-map including pixels representing Euclidean distance between a mean color vector of each pixel of the image and a vector generated through Gaussian blur treatment for the image, and wherein the global saliency-map is a saliency-map defined based on space and color of regions which are segmented to each component after representing the image in a Gaussian mixture model composed of a plurality of components;
an adaptive tri-map generator configured to generate an adaptive tri-map corresponding to the coupled saliency-map, wherein the adaptive tri-map generator generates a tri-map from the coupled saliency-map through Gaussian blur and image clustering, selects a pixel, of which distance is the least to any one of mean color values of foreground region, background region and unknown region of the tri-map among pixels of the coupled saliency-map, as the shortest distance pixel, and generates the adaptive tri-map by replacing a pixel value of the tri-map, corresponding to the shortest distance pixel and a pixel adjacent to the shortest distance pixel, as a mean color value of the foreground region when the shortest distance pixel is identical to the mean color value of the foreground region and is located within the unknown region of the tri-map;
an alpha matte generator configured to generate, using a preconditioned conjugate gradient method, an alpha matte based on the adaptive tri-map; and
an object detector configured to extract an object according to transparency of the alpha matte to generate an object image.

2. The apparatus of claim 1, wherein the alpha matte generator generates the alpha matte through a parallel processing using General-Purpose computing on Graphics Processing Unit (GPGPU).

3. The apparatus of claim 1, further comprising:
an output interface configured to show extraction result of the object; and
an input interface configured to receive a tri-map correction input which requests for correcting the adaptive tri-map from a user,
wherein the adaptive tri-map generator corrects the adaptive tri-map based on the tri-map correction input.

4. A method for extracting an object using an apparatus for extracting an object from an image, the method comprising:
receiving the image;
generating a coupled saliency-map which is the sum of the product of a global saliency-map of the image and a predetermined weight value and a local saliency-map, wherein the local saliency-map is a saliency-map including pixels representing Euclidean distance between a mean color vector of each pixel of the image and a vector generated through Gaussian blur treatment for the image, and wherein the global saliency-map is a saliency-map defined based on space and color of regions which are segmented to each component after representing the image in a Gaussian mixture model composed of a plurality of components;
generating an adaptive tri-map corresponding to the coupled saliency-map, wherein generating the adaptive tri-map comprises generating a tri-map from the coupled saliency-map through Gaussian blur and image clustering, selecting a pixel, of which distance is the least to any one of mean color values of foreground region, background region and unknown region of the tri-map among pixels of the coupled saliency-map, as the shortest distance pixel, and generating the adaptive tri-map by replacing a pixel value of the tri-map, corresponding to the shortest distance pixel and a pixel adjacent to the shortest distance pixel, as a mean color value of the foreground region when the shortest distance pixel is identical to the mean color value of the foreground region and is located within the unknown region of the tri-map;
generating an alpha matte based on the adaptive tri-map using a preconditioned conjugate gradient method; and
extracting an object according to transparency of the alpha matte to generate an object image.

5. The method of claim 4, wherein the generating an alpha matte based on the adaptive tri-map comprises generating the alpha matte through a parallel processing using General-Purpose computing on Graphics Processing Unit (GPGPU).

6. The method of claim 4, further comprising:
showing extraction result of the object;
receiving a tri-map correction input which requests for correcting the adaptive tri-map from a user;
correcting the adaptive tri-map according to the tri-map correction input; and
generating an object image according to the corrected adaptive tri-map.

* * * * *